US006250193B1

(12) United States Patent
Head

(10) Patent No.: US 6,250,193 B1
(45) Date of Patent: *Jun. 26, 2001

(54) BRAIDED STRUCTURE WITH ELASTIC BIAS STRANDS

(75) Inventor: Andrew A. Head, Indian Hill, OH (US)

(73) Assignee: A & P Technology, Inc., Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,908

(22) Filed: Oct. 2, 1997

Related U.S. Application Data

(63) Continuation-in-part of application No. 08/759,255, filed on Dec. 2, 1996, and application No. 08/759,732, filed on Dec. 6, 1996, now abandoned
(60) Provisional application No. 60/032,230, filed on Dec. 2, 1996, now abandoned.

(51) Int. Cl.[7] ..................................................... D04C 1/02
(52) U.S. Cl. ................................. 87/2; 87/1; 87/13; 87/5; 87/8
(58) Field of Search ............................. 87/1, 2, 5, 8, 13

(56) References Cited

U.S. PATENT DOCUMENTS

| Re. 28,155 | 9/1974 | Dow ................................. 139/383 R |
|---|---|---|
| 1,473,427 | 11/1923 | Handley . |
| 1,887,643 | * 11/1932 | Huber ........................................ 87/2 |
| 2,009,075 | 7/1935 | Thompson ............................. 137/90 |
| 2,114,274 | * 4/1938 | Huppert .................................... 96/26 |
| 2,396,483 | 3/1946 | Alderfer ............................... 139/421 |
| 2,935,096 | 5/1960 | Cole ..................................... 139/387 |
| 2,948,182 | * 8/1960 | Huppertsberg ............................ 87/2 |
| 3,442,738 | 5/1969 | Scott et al. ........................... 156/161 |
| 3,625,809 | 12/1971 | Caroselli et al. ....................... 161/91 |
| 3,862,878 | 1/1975 | Azuma .................................... 161/58 |
| 3,896,206 | 7/1975 | Beaver et al. ....................... 264/258 |
| 3,962,394 | 6/1976 | Hall ....................................... 264/90 |
| 3,974,012 | 8/1976 | Hogarth ............................... 156/161 |
| 4,015,641 | 4/1977 | Goff, Jr. et al. ................. 139/384 R |
| 4,047,993 | 9/1977 | Bartelmuss ............................. 156/89 |
| 4,055,201 | 10/1977 | Fowler et al. ....................... 139/421 |
| 4,055,697 | 10/1977 | Schmanski ........................... 428/113 |
| 4,191,219 | 3/1980 | Kaye ................................. 139/383 R |
| 4,228,207 | 10/1980 | Porte et al. ............................ 428/80 |
| 4,263,361 | 4/1981 | Hodes et al. ......................... 428/240 |

(List continued on next page.)

FOREIGN PATENT DOCUMENTS

| 155746 | * 9/1932 | (CH) ......................................... 87/2 |
|---|---|---|
| 0113196 | 7/1984 | (EP) . |
| 0134864 | 3/1985 | (EP) . |
| 2501579 | 9/1982 | (FR) . |
| 2510624 | 2/1983 | (FR) . |
| 2583072 | 12/1986 | (FR) . |
| 62-117732 | 5/1987 | (JP) . |
| 2-293434 | 5/1989 | (JP) . |
| 1-286832 | 11/1989 | (JP) . |
| 4-327249 | 11/1992 | (JP) . |
| 2505391 | 4/1996 | (JP) . |
| 1044880A | 9/1983 | (SU) . |
| WO91/14034 | 9/1991 | (WO) . |
| WO92/06235 | 4/1992 | (WO) . |

OTHER PUBLICATIONS

International Preliminary Examination Report, dated Oct. 20, 1998, which was received in the corresponding international application.

Primary Examiner—William Stryjewski
(74) Attorney, Agent, or Firm—Darby & Darby

(57) ABSTRACT

A triaxial braided sleeve in which the axial strands are reinforcing and the bias strands are elastic. Due to the elastic bias strands, the sleeve can be used as the reinforcement in a fiber-reinforced plastic part having a tapered, curved, or other irregular shape.

16 Claims, 2 Drawing Sheets

U.S. PATENT DOCUMENTS

| | | |
|---|---|---|
| 4,283,446 | 8/1981 | McLain . |
| 4,298,562 | 11/1981 | Latty ................................ 252/455 Z |
| 4,380,483 | 4/1983 | Kliger ................................... 264/257 |
| 4,380,523 | 4/1983 | Lind et al. ............................ 156/172 |
| 4,389,269 | 6/1983 | Cooper et al. ....................... 156/172 |
| 4,533,321 | 8/1985 | Kidd et al. .............................. 433/18 |
| 4,567,917 * | 2/1986 | Millard ................................ 138/126 |
| 4,610,688 | 9/1986 | Silvestrini et al. ....................... 623/1 |
| 4,629,225 * | 12/1986 | Rowsey ............................ 285/334.1 |
| 4,741,087 * | 5/1988 | Plummer ................................ 29/446 |
| 4,754,685 | 7/1988 | Kite et al. .................................. 87/9 |
| 4,756,942 | 7/1988 | Aichele ................................ 428/102 |
| 4,771,518 | 9/1988 | LaPointe et al. ....................... 28/143 |
| 4,774,043 | 9/1988 | Beckmann ........................... 264/134 |
| 4,777,859 | 10/1988 | Plummer, Jr. ............................. 87/7 |
| 4,834,755 | 5/1989 | Silvestrini et al. ..................... 623/13 |
| 4,907,624 * | 3/1990 | Jonasson ............................. 138/123 |
| 4,940,617 | 7/1990 | Baurmeister ........................ 428/36.3 |
| 4,946,721 | 8/1990 | Kindervater et al. ............... 428/36.1 |
| 4,976,812 | 12/1990 | McConnell et al. ................. 156/148 |
| 4,983,240 * | 1/1991 | Orkin et al. ......................... 156/148 |
| 4,992,313 * | 2/1991 | Shobert et al. ............................. 87/1 |
| 5,000,228 | 3/1991 | Manent et al. ....................... 138/124 |
| 5,013,507 | 5/1991 | Julien et al. ......................... 264/219 |
| 5,028,464 | 7/1991 | Shigetoh .............................. 428/35.9 |
| 5,048,441 | 9/1991 | Quigley ................................. 114/90 |
| 5,100,713 | 3/1992 | Homma et al. ...................... 428/102 |
| 5,108,533 * | 4/1992 | Long, Jr. et al. .................... 156/294 |
| 5,125,179 * | 6/1992 | Campbell et al. .................. 42/76.02 |
| 5,186,992 | 2/1993 | Kite, III .............................. 428/36.3 |
| 5,217,770 | 6/1993 | Morris, Jr. et al. ................. 428/36.3 |
| 5,256,459 | 10/1993 | Carlson ............................... 428/36.3 |
| 5,312,660 | 5/1994 | Morris et al. ....................... 428/36.3 |
| 5,409,651 | 4/1995 | Head .................................... 264/103 |
| 5,419,231 | 5/1995 | Earle, III et al. .......................... 87/1 |
| 5,419,949 | 5/1995 | Marx et al. .......................... 428/222 |
| 5,613,522 * | 3/1997 | Ford et al. ........................... 138/123 |
| 5,619,903 * | 4/1997 | Rogers et al. ............................. 87/5 |
| 5,700,533 * | 12/1997 | You ............................................ 87/8 |

* cited by examiner

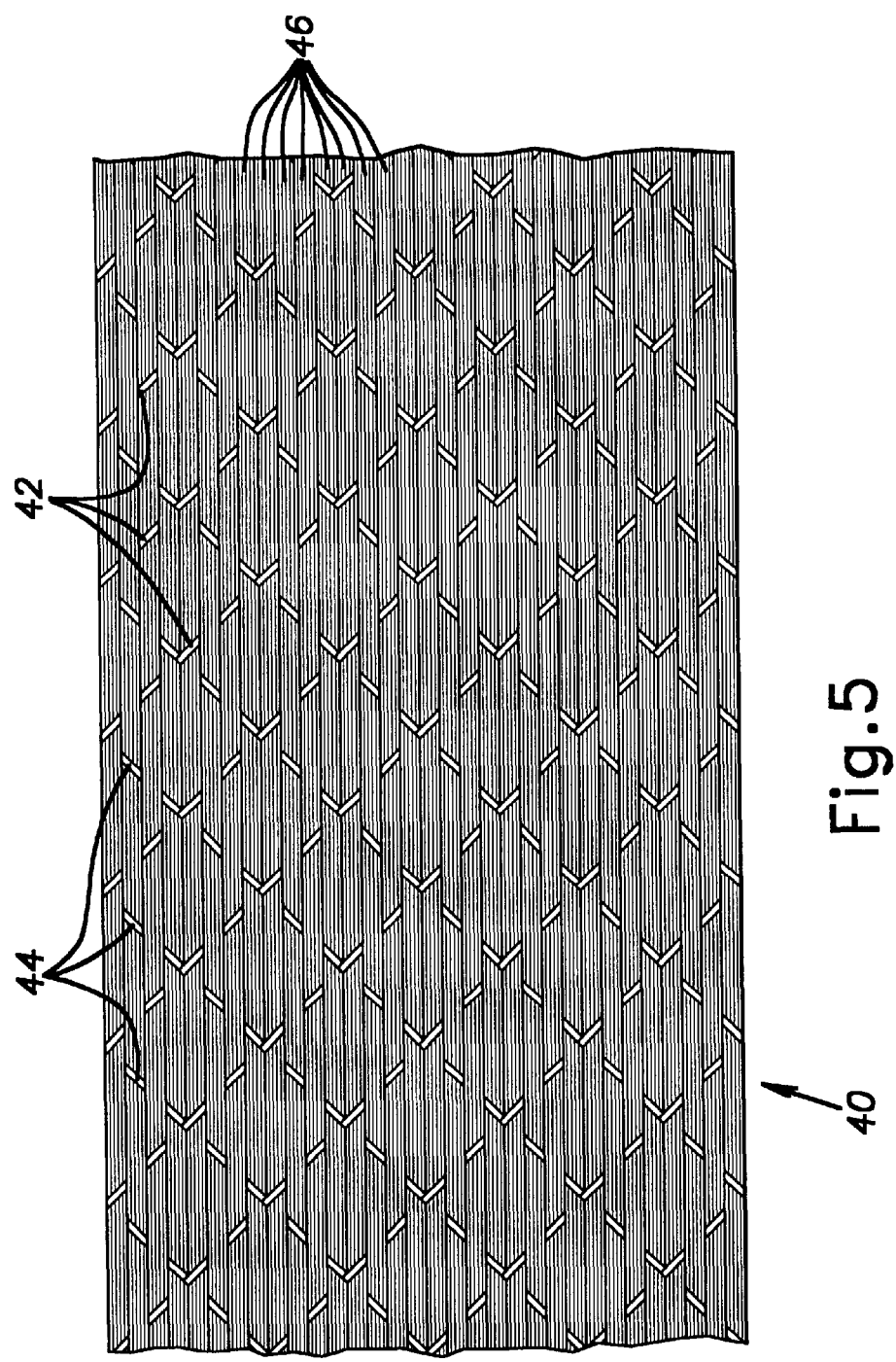
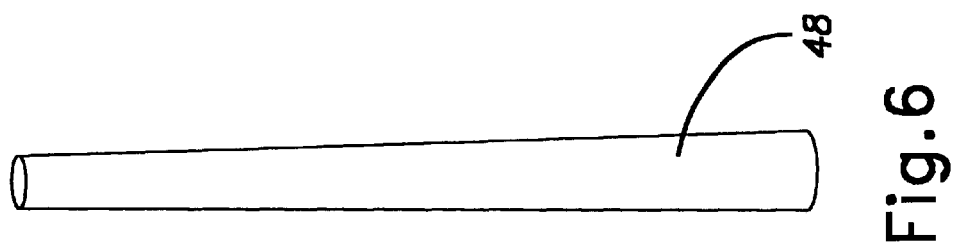

BRAIDED STRUCTURE WITH ELASTIC BIAS STRANDS

This is a continuation of application Ser. No. 08/942,908, filed Oct. 2, 1997. The most recent of these prior applications is hereby incorporated herein by reference, in its entirety. This application is a continuation-in-part of (1) U.S patent application Ser. No. 08/759,255, filed Dec. 2, 1996 and (2) U.S. patent application Ser. No. 08/759,732, filed Dec. 6, 1996, now abandoned. This application claims the benefit of U.S. Provisional Patent Application Serial No. 60/032,230, filed Dec. 2, 1996.

FIELD OF THE INVENTION

This invention relates generally to braided structures and more particularly to braided structures having elastic bias strands or filaments.

DESCRIPTION OF RELATED ART

It is known to use braided sleeving to form rigid tubular parts such as fiber-reinforced plastic parts. The braided sleeving is typically impregnated with a resin and placed in or over a mold or mandrel or core and subjected to heat and pressure to form or cure the resin and form the tubular part. See U.S. Pat. Nos. 5,409,651 and 4,774,043, the contents of which are incorporated by reference.

Biaxial and triaxial braided sleeving is known. Triaxial braided sleeving is preferable to biaxial braided sleeving in many situations because triaxial sleeving generally produces a finished part which has superior mechanical properties, principally strength and stiffness.

A problem with triaxial braided sleeving is that it has little stretchability 1) longitudinally and 2) transversely to the longitudinal axis of the sleeve. On the other hand, biaxial braided sleeving is generally stretchable both longitudinally and transversely (radially). If expanded longitudinally, a biaxial braid will contract radially; if expanded radially, it will contract longitudinally. This permits biaxial braided sleeving to be utilized to form tubular parts having varying cross-sections, i.e. alternatively smaller and larger cross-sections or diameters.

There is a need for a triaxial braided sleeving which has the ability to conform to a tubular shape having varying cross-sections. There is also a need for a fiber-reinforced plastic part made from such sleeving.

SUMMARY OF THE INVENTION

A triaxial braided sleeve is provided, comprising first bias strands extending in a first helical direction, second bias strands extending in a second helical direction different from said first helical direction, and axial reinforcement strands, said first bias strands, second bias strands and axial reinforcement strands being braided together to form a triaxial braided sleeve, all of the bias strands of the sleeve being elastic strands. A method of making the triaxial braided sleeve is also provided, along with fiber-reinforced plastic parts made utilizing the invented triaxial braided sleeve.

BRIEF DESCRIPTION OF THE DRAWINGS

FIG. 5 is a plan view of a portion of a triaxial braided sleeve in accordance with the present invention.

FIG. 6 is a side elevational view of a utility pole.

DETAILED DESCRIPTION OF THE PREFERRED EMBODIMENTS OF THE INVENTION

As used in the specification and claims herein, the term "strand" includes a single fiber or filament or thread as well as a bundle of fibers or filaments or threads. Each of the following, whether twisted or untwisted, is a strand: a fiber, a filament, a yarn, a tow, and a thread. As used in the claims herein, "elastic" means capable of being stretched repeatedly at room temperature to at least about 1.4 times its original length and which, after removal of the tensile force, will immediately return to approximately its original length. "At least 1.4 times its original length" means if the original length is 1 inch, it can be stretched to a total length of at least 1.4 inches, and after release it will return to approximately 1 inch.

Figure 1A:
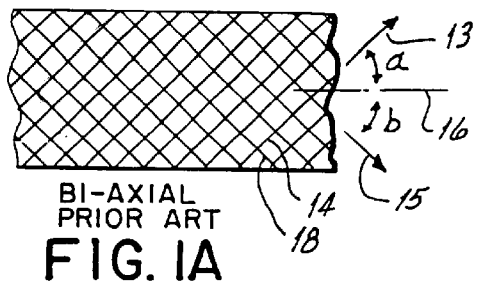
FIG. 1A is a schematic view of a portion of a prior art bi-axial braided sleeve.

With reference to FIG. 1A, there is shown a portion of a known biaxial braided sleeve which is tubular. It is formed of strands which are braided together. As known in the art, a biaxial braided sleeve has two sets of helical bias strands 14, 18. All of a plurality of first bias strands 14 extend in one direction 13 parallel to one another at an angle alpha to the longitudinal axis 16 of the sleeve. Angle alpha is the braid angle of the bias strands 14; the braid angle is the acute angle measured from the longitudinal braid axis to the bias strand. All of a plurality of second bias strands 18 extend in a second direction 15 parallel to one another at an angle beta to the longitudinal axis 16. Normally the angles alpha and beta are the same and in that case either one can be used to describe the braid angle.

Diamond braid is a known braid style, in which the bias strands are braided in an over one, under one configuration. In a style known as regular braid, the bias strands are braided in an over two, under two configuration. Regular braid and diamond braid are the most common braiding styles and are well-known in the art. Less common are the hercules braid (over three, under three) and various satin braids. Any of these braiding styles can be used in FIG. 1A.

Figure 1B:
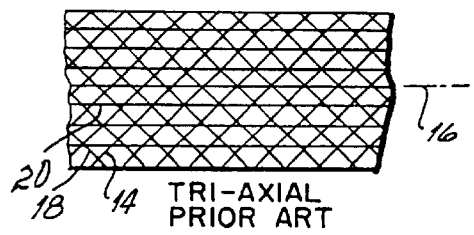
FIG. 1B is a schematic view of a portion of a prior art triaxial braided sleeve.

FIG. 1B illustrates a portion of a known triaxial braided sleeve. A triaxial braid has bias strands identical to the bias strands 14, 18 in FIG. 1A, which can be diamond braided, regular braided, etc. The triaxial braid in addition has a plurality of axial strands 20 extending parallel to the longitudinal axis of the sleeve. Axial strands are sometimes referred to as warps or unidirectionals or laid-in strands or tows or yarns. The axial strands are interwoven with the bias strands, with the bias strands passing over and under the axial strands as is known in the art. The number of axial strands can be varied, and preferably they are spaced equidistantly or regularly or uniformly around the perimeter of the sleeve, as is shown in FIG. 1B. Uniform spacing provides for uniform strength across the braid fabric.

Figure 1:
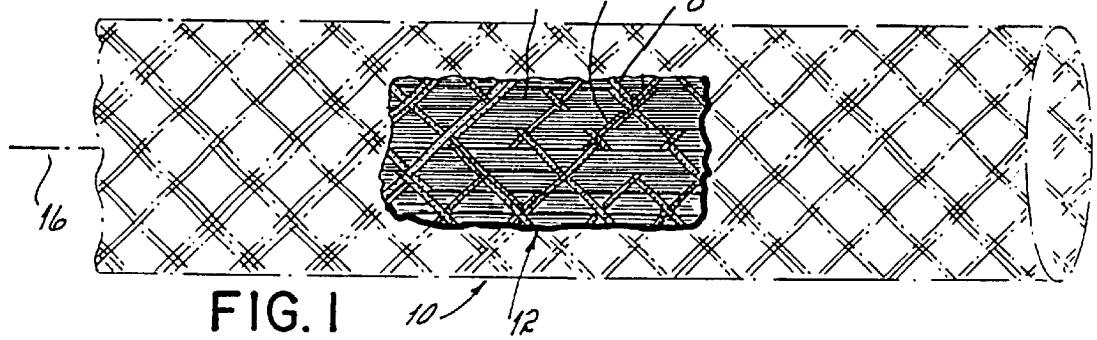
FIG. 1 is a side schematic view of a portion of a triaxial braided sleeve in accordance with the present invention, with a portion shown in more detail.

With reference to FIG. 1, there is shown a triaxial braided sleeve 10 according to the present invention. A portion 12 of sleeve 10 is shown in greater detail. Sleeve 10 has a series of elastic bias strands 4 extending in one helical direction, a second series of elastic bias strands 8 extending in the other helical direction, and a plurality of axial strands 22 extending parallel to the longitudinal axis of the sleeve. FIG. 1 shows some bias strands 4, 8 as double strands; preferably each bias strand is a single thread. In the present invention a triaxial braided sleeving or sleeve is provided in which all of the bias strands are elastic and preferably all of the axial strands are structural or reinforcing such as reinforcing tows; the axial strands are present to provide strength and stiffness and they are inelastic or nonelastic or essentially inelastic or non-stretchable and are preferably non-heat-shrinkable.

In the present invention it is preferable to maximize the amount or percentage of braid fabric or fiber material or strand material in the axial direction and minimize the amount or percentage of braid fabric or strand material in the bias direction, because the purpose of the bias strands is only to hold or maintain the axial strands in position and be elastic; the bias strands are not there to provide appreciable strength or stiffness. As long as sufficient bias strands are present to perform their function, additional bias strands would be wasteful. Therefore it is preferable to minimize the number of bias strands and minimize the weight and thickness of each bias strand. It is desired to maximize the percentage of axial strand material, which provides the strength and stiffness of the braid.

With reference to FIG. 5, there is shown a portion 40 of a triaxial braided sleeve of the present invention, having first bias strands 42 extending in a first helical direction, second bias strands 44 extending in a second helical direction, and axial reinforcement strands or tows 46 (such as 12K carbon) extending parallel to the longitudinal axis of the sleeve.

The axial strands or reinforcement strands are preferably fiberglass, carbon or aramid (KEVLAR™), less preferably ceramic, ultrahigh molecular weight polyethylene (such as SPECTRA™ brand), other synthetics such as acrylic, nylon, rayon, polypropylene, polyamide, and polyester, natural fibers such as cotton, PTFE, metals, thermoplastic yarn, and mixtures or hybrids thereof, such as fiberglass/carbon. The fiberglass strands or tows are preferably E-glass (texturized or non-texturized) or S-glass (such as S-2 glass), as known in the art, preferably 37 to 1800 yield, more preferably 450 to 1200 yield, commonly 112, 450, 827, 1200 and 1800 yield. These are known in the art and are available from OWENS CORNING™ Fiberglass and PPG™, such as PPG™'s 2002-827 Hybon and OWENS CORNING™'s Product No. 111A 275. The carbon strands or tows are preferably 3K, 6K, 12K and 48K, both commercial grade and aerospace grade, available from HEXCEL™, TOHO™, TORAY™, AMOCO™ and GRAFIL™, including AS4 carbon and HEXCEL™ Product No. IM7-GP12K. The aramid strands or tows are preferably KEVLAR™ brand from DuPONT™, KEVLAR™ 29 and KEVLAR™ 49, preferably 200 to 1500 denier, such as 200, 380, 1140, 1420, and 1500 denier. These strands can have sizing, such as Nos. 964 or 965 as known in the art. These structural or reinforcement strands typically have 1–6% strain to failure (ASTM D2101), meaning they will stretch 1–6% and then break; as can be seen they are essentially inelastic. With reference to FIG. 5, the axial strands 46 are preferably all the same, less preferably they can vary, such as every fifth one or every other one being carbon and the rest fiberglass, or the strands on one side of the sleeve being heavy fiberglass and the strands on the other side of the sleeve being lighter fiberglass.

The elastic bias strands are preferably elastic threads or elastic yarns as known in the art. An elastic thread typically has a core of an elastomer such as natural or synthetic rubber or similar elastomer or spandex and may or may not have a cover or serving of natural or synthetic fibers or fabric, typically cotton, nylon or polyester. If the elastic thread is uncovered, it preferably will stretch at least 200, 400, 500, 600 or 700%; it preferably will have 100–800%, more preferably 400–800%, maximum stretch or elongation at break. If a one inch thread has 700% maximum stretch, that means it will stretch at room temperature to eight inches and then break or fail; since it is elastic it will return to approximately one inch length if released before breakage. If the elastomer or rubber or spandex core is covered, the elastic thread preferably has at least 70, 100, 200, or 300%, or about 100–150%, 100–200%, or 100–400%, maximum stretch or elongation at break; if a one inch thread has 130% maximum stretch, that means that it will stretch to a maximum of 2.3 inches before failing or tearing the cover. The cover acts to control or limit the stretch (which may make braiding easier), imparts additional tensile strength, and frequently makes the thread slipperier; covered thread is preferred where these characteristics are useful.

The elastic thread has a maximum stretch of at least 40%, more preferably at least 75%, more preferably at least about 90%, more preferably at least 100%, typically at least 100, 200, or 300%, or about 100–200, 100–400, or 100–800, % maximum stretch. The elastic thread preferably has a weight of 250 to 6000, more preferably 700–4400, yds/lb. Suitable elastic threads for use in the present invention include No. SE144 (rubber core with nylon cover, 785 yds/lb., having 130% max. stretch), uncovered Lycra brand spandex having 700% max. stretch, 560–650 denier, and No. 135A9J (Lycra brand spandex core with polyester cover, 4200 yds/lb., having 120% max. stretch), available from SUPREME CORP.™, Hickory, N.C.

The present invention is made on conventional braiding machines or braiders having 8 to 800 or more carriers, typically having 80 to 400 or 500 or 600 carriers, for example 144 or 208 carriers, although braiders with 16 to 80 carriers are useful for smaller sleeves such as for a golf club shaft. A conventional 144 carrier braider has 72 axial positions. As known in the art, a conventional braider has one axial position for every two carriers. In producing the invented braid preferably all of the axial positions on the braider are used, in order to maximize the percentage of the braid fabric in the axial position or direction. Less preferably, less than all the axial positions are utilized.

When a conventional 144 carrier braider is run utilizing all 144 carriers and all 72 axial positions, a regular braid is produced having 72 bias strands extending in one bias direction, 72 bias strands extending in the other bias direction, and 72 axial strands running longitudinally. When that 144 carrier braider is run utilizing only 72 of the carriers (36 in one bias direction and 36 in the other bias direction), a diamond braid is produced. When that 144 carrier braider is run utilizing only 36 of the carriers (18 in one bias direction and 18 in the other bias direction), a braid referred to herein as a double diamond braid is produced. When that 144 carrier braider is run utilizing only 18 of the carriers (9 in one bias direction and 9 in the other bias direction), a braid referred to herein as a triple diamond braid is produced. Regular, diamond, double diamond, and triple diamond braids can be produced on braiders having other numbers of carriers (eg., 80 carriers, 208 carriers, 400 carriers) by using the same ratios. As used in the specification and claims herein, diamond, double diamond, and triple diamond shall have the meanings as described above.

The invented braid is preferably made on a regular braider (a braider which makes regular braid when its full compliment of carriers are utilized) utilizing ½ to about 1/75, more preferably ½ to about 1/60, more preferably about ¼ to about 1/40, more preferably about ⅛ to about 1/20, alternatively about 1/12 to about 1/16, of the full compliment of carriers, preferably not more than ½ or ¼ or ⅛ or 1/12 or 1/16, and preferably not less than 1/75 or 1/60 or 1/40 or 1/20, of the full compliment of carriers, subject to the condition that the carriers utilized are equally spaced and symmetrically arrayed with an equal number of carriers going in each direction. For example, a 600 carrier braider could utilize 1/60, or ten carriers, with five going in each direction and symmetrically arrayed. Regarding the invented braid, a triple diamond braid is preferable to a double diamond braid, which is preferable to a diamond braid.

As used in the specification and claims herein, an "axial position strand" is all of the fibers or filaments or strands or threads or tows going through one axial position on a braider, and a "bias carrier strand" is all of the fibers or filaments or strands or threads or tows on a single carrier of a braider. In the present invention each axial position strand will typically be one or two or three or four tows of reinforcing filaments and each bias carrier strand will typically be one elastic thread. In the invented braid the ratio of axial position strands to bias carrier strands (including, by definition, those bias strands going one way and those bias strands going the other way) is preferably at least 1:1, more preferably at least 2:1, more preferably at least 4:1, more preferably at least 6:1, alternatively at least 8:1 or 10:1 or 20:1 or 30:1, preferably not more than 37.5:1 or 30:1, alternatively not more than 20:1 or 10:1 or 8:1. For example, a 600 carrier braider using ten carriers and 300 axial positions produces a braid having a ratio of axial position strands to bias carrier strands of 300:10 or 30:1. Preferably, whenever less than all the carriers or axial positions are used, those that are used are spaced as evenly or equidistantly or uniformly around the braider as possible.

As an option, a portion of the axial positions can be one reinforcing strand and the other portion of the axial positions can be a different weight or type of reinforcing strand; for example on a snowboard it may be desirable to have more reinforcing on the bottom than on the top. This is achieved by loading thicker, heavier fiberglass on the axial positions around one half of the braider deck and loading a lighter fiberglass or carbon, etc. on the axial positions around the other half of the braider deck. The resulting sleeve would have a bottom half (for the bottom of the snowboard) heavily reinforced with fiberglass and a top half (for the top half of the snowboard) with less fiberglass reinforcing or alternatively lighter carbon or aramid reinforcing. These same principles can be applied to produce differentially or asymmetrically reinforced sleeving for other products such as curves in furniture, different sides of hockey sticks, different sides of snow skis, etc. A side facing or experiencing more stress may be more heavily reinforced. Stated more generally, the braided sleeve would have a first axial position strand of a first material and a second axial position strand of a second material, the first material being different from the second material in type (for example, one is fiberglass and the other is carbon or fiberglass/carbon) or weight (for example, one is 112 yield fiberglass and the other is 827 yield fiberglass). Preferably, at least 10%, more preferably 20%, more preferably 30%, more preferably 40%, more preferably 45%, more preferably about 50%, of the axial position strands are of the first material, with the remaining axial position strands being of the second material; optionally some of the remaining axial position strands can be of a third material, a fourth material, etc; preferably at least 10%, more preferably 20%, more preferably 30%, more preferably 40%, more preferably 45%, more preferably about 50%, of the axial position strands are of the second material.

When the braider is set up to produce the invented braid, elastic strands are loaded onto the carriers being utilized (preferably one end or thread per carrier, less preferably more than one end or thread per carrier) and set at light to medium spring tension. Reinforcement strands (such as 112 or 450 yield E-glass or 12K carbon) are placed in the axial positions, typically one, two, three, or four ends per position (although up to about 8 ends per position can be used). The amount of reinforcement strands is generally a function of the amount of reinforcing needed in the finished part, which is generally known in the art. Preferably the reinforcement axial strands are run from supplier packages under the machine rather than from spools. The axial strands are set to very light to no tension. The machine is then set to produce a braid angle of 35–75°, more preferably 45–75°, more preferably 40–70°, more preferably 45–65°, more preferably 50–63°, more preferably 55–60°, typically 57° or 60°.

It is preferred to minimize the weight percent of the braided fabric which is elastic strands; preferably elastic strands make up 0.1–20 (or more), more preferably 0.5–15, more preferably 1–10, more preferably 2–6, preferably less than 20, more preferably less than 10, more preferably less than 7.5, more preferably less than 5, more preferably less than 3, weight percent of the braided fabric, with the balance being reinforcement strands. The invented braided sleeve, in its relaxed state, is preferably about 0.01–24, more preferably about 0.1–8, more preferably about 0.5–5, inches in diameter.

The braid produced can then be used to produce fiber-reinforced plastic parts as are well-known in the art. The braided sleeving can be impregnated with a resin (such as epoxy, polyester, vinyl ester, polyurethane, phenolic, nylon, acrylic, and other thermosets or thermoplastics) and placed in or over a mold or substrate or base form or core or mandrel and subjected to heat and/or pressure to form or cure the resin and form the part. The processes that can be utilized include resin transfer molding (RTM) and Scrimp brand molding, hand lay-up, compression molding, pultrusion molding, "B stage" forming, and autoclave molding, all as known in the art. The resins and molding techniques that can be used to make reinforced plastic parts using the invented braided sleeving are well-known in the art and are, for example, described and referred to in U.S. Pat. Nos. 5,419,231; 5,409,651; 4,283,446; 5,100,713; 4,946,721; and 4,774,043 and the U.S. patents mentioned in those patents, the disclosures of all of which are incorporated herein by reference.

Figure 2:
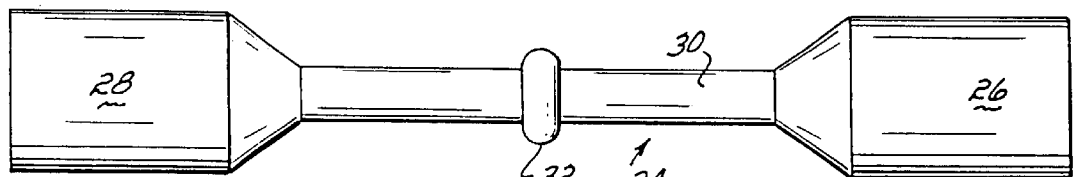
FIG. 2 is a side elevational view of a mandrel in the shape of an article of manufacture to be formed, for example a rifle scope.
Figure 3A:
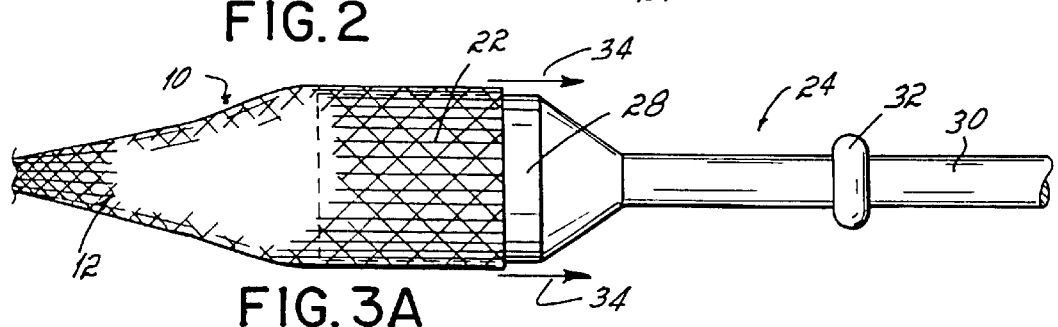
FIG. 3A is a fragmentary side view of the sleeve of FIG. 1 being placed over the mandrel of FIG. 2.
Figure 3B:
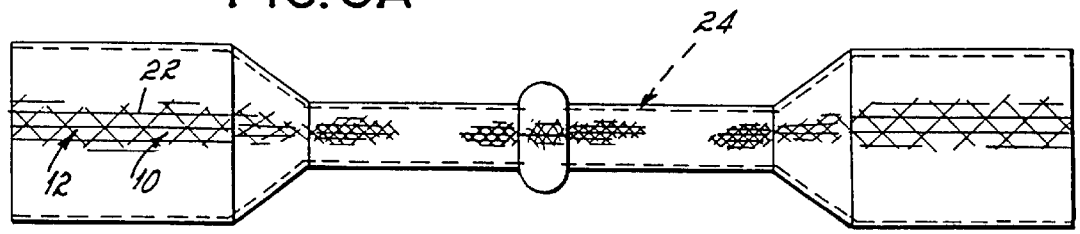
FIG. 3B is a side elevational view of the sleeve of FIG. 1 placed over the mandrel of FIG. 2.
Figure 4:
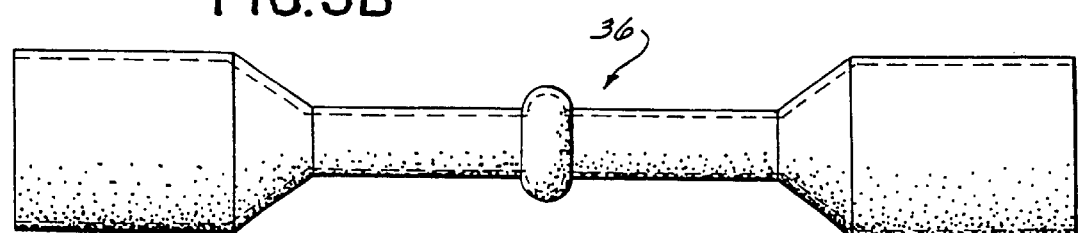
FIG. 4 is a side elevational view of the finished part manufactured according to the process of the present invention.

FIGS. 2–4 illustrate a method of manufacturing an article incorporating the sleeve of FIG. 1. FIG. 2 illustrates a mandrel 24 generally in the shape of the article to be formed, for example, a tube scope to be mounted on a firearm. The mandrel 24 has two end sections 26, 28 of a relatively large diameter and a middle narrow section 30 having a much smaller diameter. In the middle of the middle section 30 is an annular enlargement 32 of a larger diameter than the remainder of middle section 30 but of a smaller diameter than the end sections 26, 28. Although one specific mandrel having cross-sections of differing diameters is illustrated, many variations thereof may be used to form many different shaped parts.

FIG. 3A illustrates the sleeve of FIG. 1 being placed over the mandrel of FIG. 2 from left to right in the direction of arrows 34. Due to the elastic bias strands of braided sleeve 10, the sleeve may be radially expanded over the different portions of the mandrel and maintain a snug fit throughout the entire length of the mandrel, and maintain the axial strands 22 equidistantly or equally or uniformly spaced around the perimeter of the various cross-sections of the mandrel, thus providing more uniform strength across the finished part. The invented axial reinforcing sleeve can be stretched over tapered, curved, or other irregular shapes, distributing the axial reinforcements uniformly around the perimeter of the part. The relaxed diameter of the sleeve is selected so that it is no larger than the narrowest diameter of the mandrel. When the sleeve is stretched over the mandrel or core or form or substrate, preferably its final stretched state is not more than 50, less preferably 75, less preferably 100, less preferably 200, percent more than its relaxed state, since greater stretching more greatly separates the axial strands, resulting in less strength and stiffness, although the sleeve can in less critical applications be stretched up to 700 and 800 percent and more. The sleeve is particularly effective for cores or mandrels whose greatest cross-sectional perimeter (perimeter at the cross section) is not more than 50, less preferably 75, less preferably 100, less preferably 200, percent more than its least cross-sectional perimeter, for the reason set forth above. As can be seen in FIG. 3B, the sleeve covers the entire length of the mandrel.

At some point in the process the sleeve is preimpregnated ("prepreg"), impregnated or covered or coated with resin and the part is then cured or formed, typically via application of heat and/or pressure, all as known in the art previously described. The part is cooled and the mandrel is typically removed. Alternatively a substrate or form (such as a polyurethane foam core or other foam core) is used which functions as a mandrel but is not removed and becomes part of the finished article; this is also known in the fiber-reinforced plastic art. The resulting tubular article 36 is shown in FIG. 4. FIG. 6 shows a tapered hollow utility pole or tube 48 made in a similar manner.

Fiber-reinforced plastic parts known in the art having varying cross sections can be advantageously made using the present invention, including golf club shafts, lighting poles, hollow utility poles or tubes, pipes, tubing with bends and diameter changes, ducting for aircraft such as air conditioning ducting, electric transmission poles, ski poles, fishing rods or poles, flag poles, push poles for boats (tapered at each end), bicycle parts, including seats, wheels and frames, hockey sticks, field hockey sticks, snowboards, wakeboards, snow skis, water skis, firearm (such as rifle) scopes, tapered poles, tapered bars or rods, connectors for tubing, and parts having complex shapes like parts of a chair or commercial furniture such as the corners or bends.

Although the preferred embodiments of this invention have been shown and described, it should be understood that various modifications and rearrangements of the parts may be resorted to without departing from the scope of the invention as disclosed and claimed herein.

What is claimed is:

1. A triaxial braided sleeve comprising first bias strands extending in a first helical direction, second bias strands extending in a second helical direction different from said first helical direction, and axial reinforcement strands, said first bias strands, second bias strands and axial reinforcement strands being interlaced together to form said sleeve, said first and second bias strands being elastic and said axial reinforcement strands being generally inelastic relative to said first and second bias strands, said sleeve being one of not more than 7 percent weight of a combination of said first and second bias strands and the remaining percent weight being said axial reinforcement strands and a ratio of at least 2:1 of said axial reinforcement strands to said combination of said first and second bias strands.

2. A sleeve according to claim 1, said sleeve having a ratio of said axial reinforcement strands to a combination of said first bias strands and said second bias strands of at least 4:1.

3. A sleeve according to claim 1, wherein each said elastic thread is capable of being stretched to at least about 1.9 times its original length.

4. A sleeve according to claim 3, said elastic thread being covered elastic thread.

5. A sleeve according to claim 1, wherein each of said first bias strands and each of said second bias strands having a braid angle of 45–75°.

6. A triaxial braided sleeve comprising first bias strands extending in a first helical direction, second bias strands extending in a second helical direction different from said first helical direction, and axial reinforcement strands, said first bias strands, second bias strands and axial reinforcement strands being interlaced together to form said sleeve, said first and second bias strands being elastic and said axial reinforcement strands being generally inelastic relative to said first and second bias strands, said sleeve being a diamond braid based on having been produced on a conventional braiding machine utilizing not more than ¼ of the carriers of said conventional braiding machine.

7. A sleeve according to claim 6, said sleeve being a triple diamond braid based on having been produced on a conventional braiding machine utilizing not more than ⅛ of the carriers of said conventional braiding machine.

8. A sleeve according to claim 6, wherein each said elastic thread is capable of being stretched to at least about 1.9 times its original length.

9. A sleeve according to claim 8, said elastic thread being covered elastic thread.

10. A sleeve according to claim 6, wherein each of said first bias strands and each of said second bias strands having a braid angle of 45–75°.

11. A triaxial braided sleeve comprising first bias strands extending in a first helical direction, second bias strands extending in a second helical direction different from said first helical direction, and axial reinforcement strands, said first bias strands, second bias strands and axial reinforcement strands being interlaced together to form said sleeve, said first and second bias strands being elastic and said axial reinforcement strands being generally inelastic relative to said first and second bias strands, said axial reinforcement strands including a first axial reinforcement strand of a first material and a second axial reinforcement strand of a second material, said first material being different from said second material in one of type and weight.

12. A sleeve according to claim 11, wherein at least 10% of the axial reinforcement strands of the sleeve are formed of said first material and at least 40% of the axial reinforcement strands of the sleeve are formed of said second material.

13. A sleeve according to claim 12, wherein at least 30% of the axial reinforcement strands of the sleeve are formed of said first material.

14. A fiber-reinforced plastic part comprising a triaxial braided sleeve in a resin matrix, said sleeve comprising first bias strands extending in a first helical direction, second bias strands extending in a second helical direction different than said first helical direction and axial reinforcement strands, all of said first and second bias strands of the sleeve being in their natural state elastic threads and said axial reinforcement strands being generally inelastic relative to said first and second bias strands.

15. A part according to claim 14, wherein said part is a tapered tube.

16. A part according to claim 14, wherein said part is a utility pole.

* * * * *